United States Patent
Lin et al.

(10) Patent No.: US 10,513,602 B2
(45) Date of Patent: Dec. 24, 2019

(54) POLYMER COMPOSITE MATERIAL, METHOD FOR MANUFACTURING THE POLYMER COMPOSITE MATERIAL, CAPACITOR PACKAGE STRUCTURE USING THE POLYMER COMPOSITE MATERIAL AND METHOD FOR MANUFACTURING THE CAPACITOR PACKAGE STRUCTURE

(71) Applicant: APAQ TECHNOLOGY CO., LTD., Miaoli County (TW)

(72) Inventors: Chieh Lin, Hsinchu County (TW); Ching-Feng Lin, Hsinchu County (TW); Ming-Tsung Chen, Changhua County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 1 day.

(21) Appl. No.: 15/672,933

(22) Filed: Aug. 9, 2017

(65) Prior Publication Data
US 2018/0163040 A1    Jun. 14, 2018

(30) Foreign Application Priority Data
Dec. 9, 2016 (TW) .............................. 105140847 A

(51) Int. Cl.
H01G 9/025 (2006.01)
H01G 9/042 (2006.01)
(Continued)

(52) U.S. Cl.
CPC ............... *C08L 25/16* (2013.01); *C08F 8/14* (2013.01); *C08L 25/18* (2013.01); *H01G 9/00* (2013.01); *H01G 9/0029* (2013.01); *H01G 9/012* (2013.01); *H01G 9/025* (2013.01); *H01G 9/042* (2013.01); *H01G 9/0425* (2013.01); *C08G 2261/1424* (2013.01); *C08G 2261/3223* (2013.01); *C08G 2261/512* (2013.01); *C08L 65/00* (2013.01); *C08L 2203/20* (2013.01)

(58) Field of Classification Search
CPC . C08L 25/16; C08L 65/00; C08F 8/14; H01G 9/0425; H01G 9/0036; H01G 9/15; H01G 9/025; H01G 9/042
USPC ........................................ 361/523, 525, 526
See application file for complete search history.

(56) References Cited

U.S. PATENT DOCUMENTS

2015/0170844 A1* 6/2015 Vilc ..................... H01G 9/0036
361/525

* cited by examiner

*Primary Examiner* — Eric W Thomas
*Assistant Examiner* — Arun Ramaswamy
(74) *Attorney, Agent, or Firm* — Li & Cai Intellectual Property (USA) Office

(57) ABSTRACT

The instant disclosure provides a polymer composite material, the method for manufacturing the polymer composite material, a capacitor package structure using the polymer composite material and the method for manufacturing the capacitor package structure. The polymer composite material is used for the cathode of a capacitor, wherein the polymer composite material includes poly(3,4-ethylenedioxythiophene), polystyrene sulfonate and a nanomaterial. Polystyrene sulfonate is connected between the nanomaterial and poly(3,4-ethylenedioxythiophene), and polystyrene sulfonate is bonded to the poly(3,4-ethylenedioxythiophene) through a polymerization process. The content of the nanomaterial ranges from 0.01-1.5 wt. % based on the weight of the polymer composite material.

14 Claims, 9 Drawing Sheets

(51) Int. Cl.
*H01G 9/15* (2006.01)
*H01G 9/00* (2006.01)
*C08L 25/16* (2006.01)
*C08L 65/00* (2006.01)
*C08F 8/14* (2006.01)
*H01G 9/012* (2006.01)
*C08L 25/18* (2006.01)

POLYMER COMPOSITE MATERIAL, METHOD FOR MANUFACTURING THE POLYMER COMPOSITE MATERIAL, CAPACITOR PACKAGE STRUCTURE USING THE POLYMER COMPOSITE MATERIAL AND METHOD FOR MANUFACTURING THE CAPACITOR PACKAGE STRUCTURE

BACKGROUND

1. Technical Field

The instant disclosure relates to a polymer composite material, and in particular, to a polymer composite material for capacitor package structures.

2. Description of Related Art

Capacitors are widely used in consumer appliances, computers, power supplies, communication products and vehicles, and hence, are important elements for electronic devices. The main effects of the capacitors are filtering, bypassing, rectification, coupling, decoupling and phase inverting, etc. Based on different materials and uses thereof, capacitors can be categorized into aluminum electrolytic capacitors, tantalum electrolytic capacitors, laminated ceramic capacitors and thin film capacitors. In the existing art, solid electrolytic capacitors have the advantages of small size, large capacitance and excellent frequency property and can be used in the decoupling of the power circuits of central processing units. Solid electrolytic capacitors use solid electrolytes instead of liquid electrolytic solutions as cathodes. Conductive polymers are suitable for the cathode material of the capacitors due to its high conductivity, and the manufacturing process using conductive polymers are simple and low cost. Conductive polymers comprise polyaniline (PAni), polypyrrole (PPy) and polythiophene (PTh) and their derivatives.

In the technical field of the instant disclosure, there is a need to improve the electrical performance of the solid electrolytic capacitor package structures.

SUMMARY

In order to achieve the object mentioned above, an embodiment of the present disclosure provides a polymer composite material for a cathode portion of a capacitor. The polymer composite material comprises a poly(3,4-ethylenedioxythiophene) unit, a polystyrene sulfonate unit and a carbon nanomaterial, the polystyrene sulfonate unit is connected between the poly(3,4-ethylenedioxythiophene) unit and the carbon nanomaterial, and the polystyrene sulfonate unit is bonded to poly(3,4-ethylenedioxythiophene) through a polymerization process. A content of the carbon nanomaterial ranges from 0.01-1.5 wt. % based on a weight of the polymer composite material.

Another embodiment of the instant disclosure provides a capacitor package structure comprising at least a capacitor, and a cathode portion of the capacitor comprises the polymer composite material mentioned above.

Another embodiment of the instant disclosure provides a method for manufacturing a polymer composite material, comprising: mixing a carbon nanomaterial with polystyrene sulfonate to form a carbon nanomaterial modified by polystyrene sulfonate; adding 3,4-ethylenedioxythiophene into a solution comprising the carbon nanomaterial modified by polystyrene sulfonate; and initiating a polymerization reaction to allow a reaction between 3,4-ethylenedioxythiophene and the carbon nanomaterial modified by polystyrene sulfonate in the solution for forming a product stream comprising the polymer composite material. The polymer composite material comprises a poly(3,4-ethylenedioxythiophene) unit, a polystyrene sulfonate unit and the carbon nanomaterial. The polystyrene sulfonate unit is connected between the poly(3,4-ethylenedioxythiophene) unit and the carbon nanomaterial, and the polystyrene sulfonate unit is bonded to the poly(3,4-ethylenedioxythiophene) unit through a polymerization process. A content of the carbon nanomaterial ranges from 0.01-1.5 wt. % based on a weight of the polymer composite material.

Another embodiment of the present disclosure provides a method for manufacturing a capacitor package structure, comprising: providing at least a capacitor having a cathode comprising the polymer composite material manufactured by the method mentioned above; and packaging the capacitor with a package structure, wherein a positive pin and a negative pin both electrically connected to the capacitor are exposed from the package structure.

The main technical means of the instant disclosure is that the polymer composite material comprises a carbon nanomaterial of specific content and thus has excellent electric property. Therefore, the solid electrolytic capacitor comprising the polymer composite has improved conductivity, improved thermal stability, improved polymer impregnating rate, improved capacitance, reduced equivalent series resistance, reduced loss factor and reduced leak current. In addition, the method of manufacturing the polymer composite material of the instant disclosure has reduced manufacturing cost and hence, the overall manufacturing cost of the solid electrolytic capacitor is reduced.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
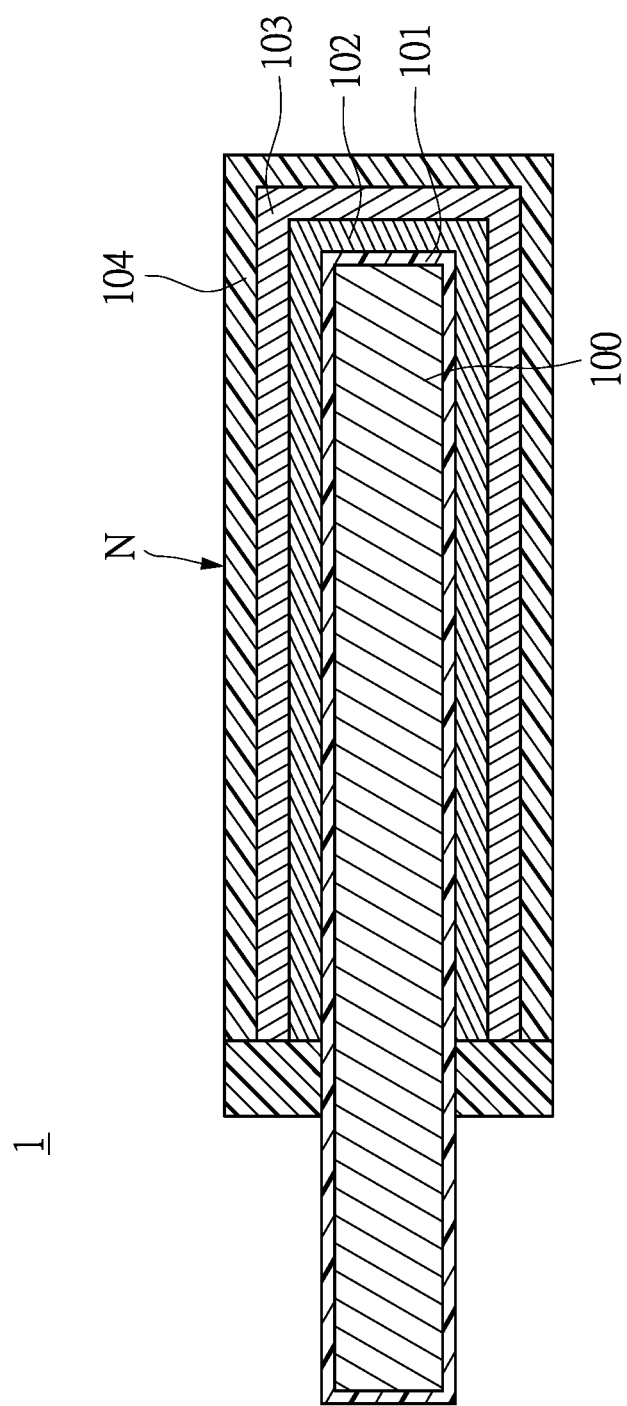
FIG. 1 is a sectional view of one of the capacitor packaging using a polymer composite material provided by the embodiments of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2:
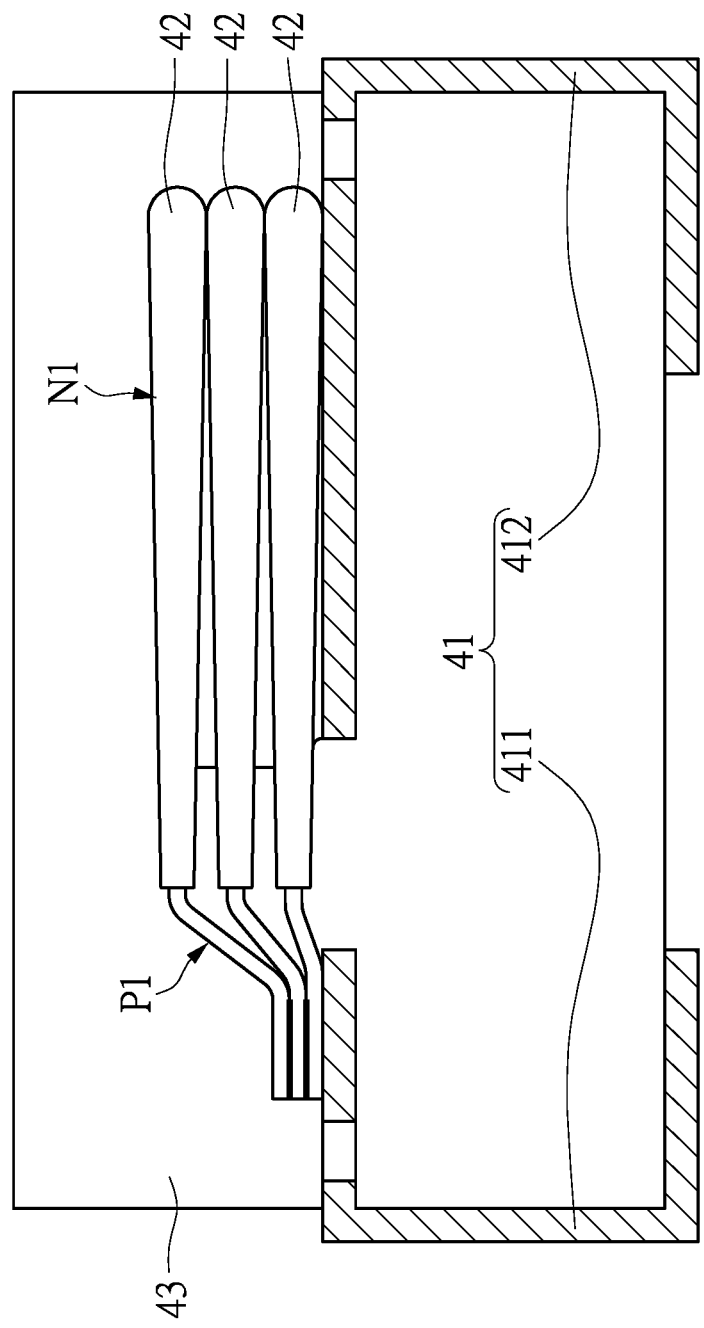
FIG. 2 is a sectional view of one of the capacitor packaging provided by the embodiments of the instant disclosure.

Please refer to FIG. 1 and FIG. 2. FIG. 1 is a sectional view of one of the capacitor packaging using a polymer composite material provided by the embodiments of the instant disclosure, and FIG. 2 is a sectional view of one of the capacitor packaging provided by the embodiments of the instant disclosure. Specifically, the polymer composite material 2 provided by the instant disclosure can be used in the conductive polymer layer 102 of the cathode portion N of the capacitor 1. In FIG. 2, the capacitor 1 is the capacitor unit 42 of the stacked type solid electrolytic capacitor 4.

For example, as shown in FIG. 1, the capacitor 1 comprises the metal foil 100, the oxide layer 101 enclosing the metal foil 100, the conductive polymer layer 102 enclosing a part of the conductive polymer layer 102, the carbon paste layer 103 enclosing the conductive polymer layer 102, and the silver paste layer 104 enclosing the carbon paste layer 103. The structure of the capacitor 1 can be adjusted according to the requirement of the products. The conductive polymer layer 102 is used as the solid electrolytic of the capacitor 1.

As shown in FIG. 2, the stacked type solid electrolytic capacitor 4 comprises a plurality of capacitor units 42 stacked one above another. In addition, the stacked type solid electrolytic capacitor 4 comprises a conductive frame 41. The conductive frame 41 comprises a first conductive terminal 411 and a second conductive terminal 412 separated from the first conductive terminal 411 for a predetermined distance. The plurality of capacitor units 42 has a first positive electrode portion P1 electrically connected to the first conductive terminal 411 of the corresponding conductive frame 41 and a first negative electrode portion N1 electrically connected to the second conductive terminal 412 of the corresponding conductive frame 41. In addition, a plurality of capacitor units 42 electrically connected to each other and stacked one above another are enclosed by a package 43, thereby forming the stacked type solid electrolytic capacitor 4.

Figure 3:
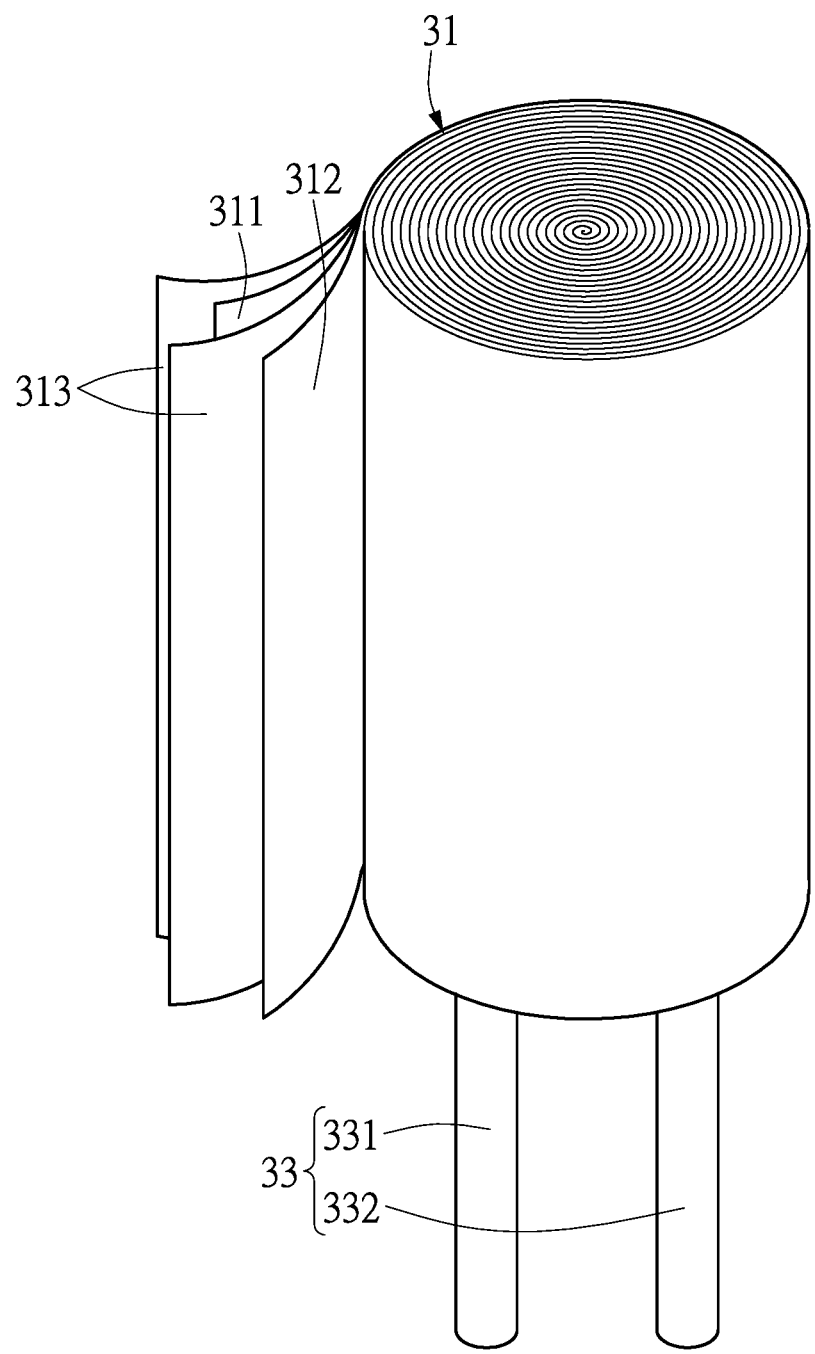
FIG. 3 is a three-dimensional schematic view of another capacitor using the polymer composite material provided by the embodiments of the instant disclosure.
Figure 4:
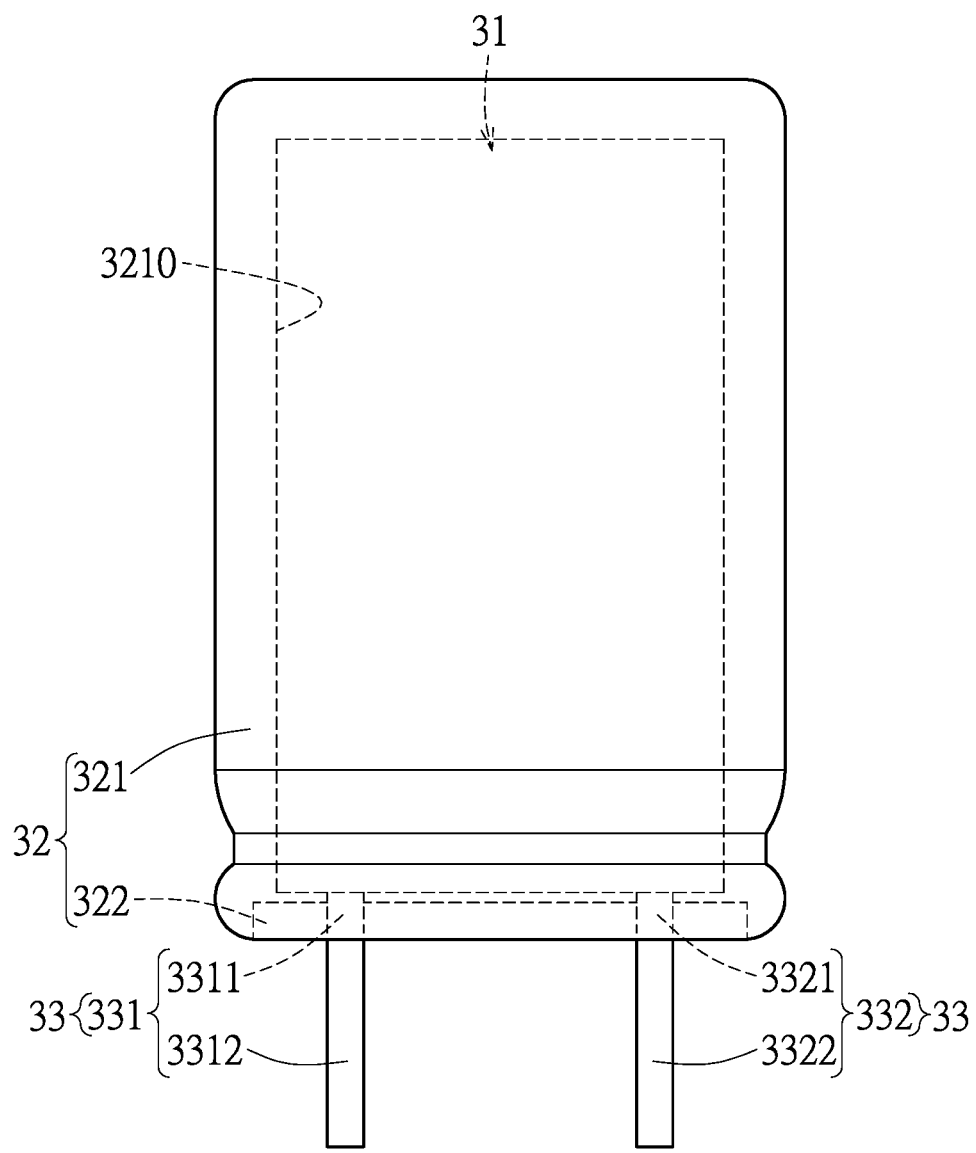
FIG. 4 is a side schematic view of another capacitor package structure provided by the embodiments of the instant disclosure.

Please refer to FIG. 3 and FIG. 4. FIG. 3 is a three-dimensional schematic view of another capacitor using the polymer composite material provided by the embodiments of the instant disclosure, and FIG. 4 is a side schematic view of another capacitor package structure provided by the embodiments of the instant disclosure. In FIG. 3 and FIG. 4, the capacitor 1 is the capacitor unit in the wound type solid electrolytic capacitor 3.

As shown in FIG. 4, the wound type solid electrolytic capacitor 3 comprises a wound type component 31, a packaging component 32 and a conductive component 33. Please refer to FIG. 3. The wound type component 31 comprises a wound type positive electrode conductive foil 311, a wound type negative electrode conductive foil 312 and two wound type isolating foils 313. Furthermore, one of the wound type isolating foils 313 is disposed between the wound type positive electrode conductive foil 311 and the wound type negative electrode conductive foil 312, and one of the wound type positive electrode conductive foil 311 and the wound type negative electrode conductive foil 312 is disposed between the two wound type isolating foils 313. The wound type isolating foils 313 can be isolating papers or paper foils having the polymer composite material coated thereon by impregnation.

Please refer to FIG. 4. The wound type component 31 is enclosed in the packaging component 32. For example, the packaging component 32 comprises a capacitor casing structure 321 (such as an aluminum casing or a casing made of other metals) and a bottom end sealing structure 322. The capacitor casing structure 321 has an accommodating space 3210 for accommodating the wound type component 31. The bottom end sealing structure 322 is disposed in the accommodating space 3210 located at the bottom end of the capacitor casing structure 321. In addition, the packaging component 32 can be a package made of any insulating materials.

The conductive component 33 comprises a first conductive pin 331 electrically contacting the wound type positive electrode conductive foil 311 and a second conductive pin 332 electrically contacting the wound type negative electrode conductive foil 312. For example, the first conductive pin 331 has a first buried portion 3311 enclosed in the packaging component 32 and a first exposed portion 3312 exposed from the packaging component 32. The second conductive pin 332 has a second buried portion 3321 enclosed in the packaging component 32 and a second exposed portion 3322 exposed from the packaging component 32.

Figure 5:
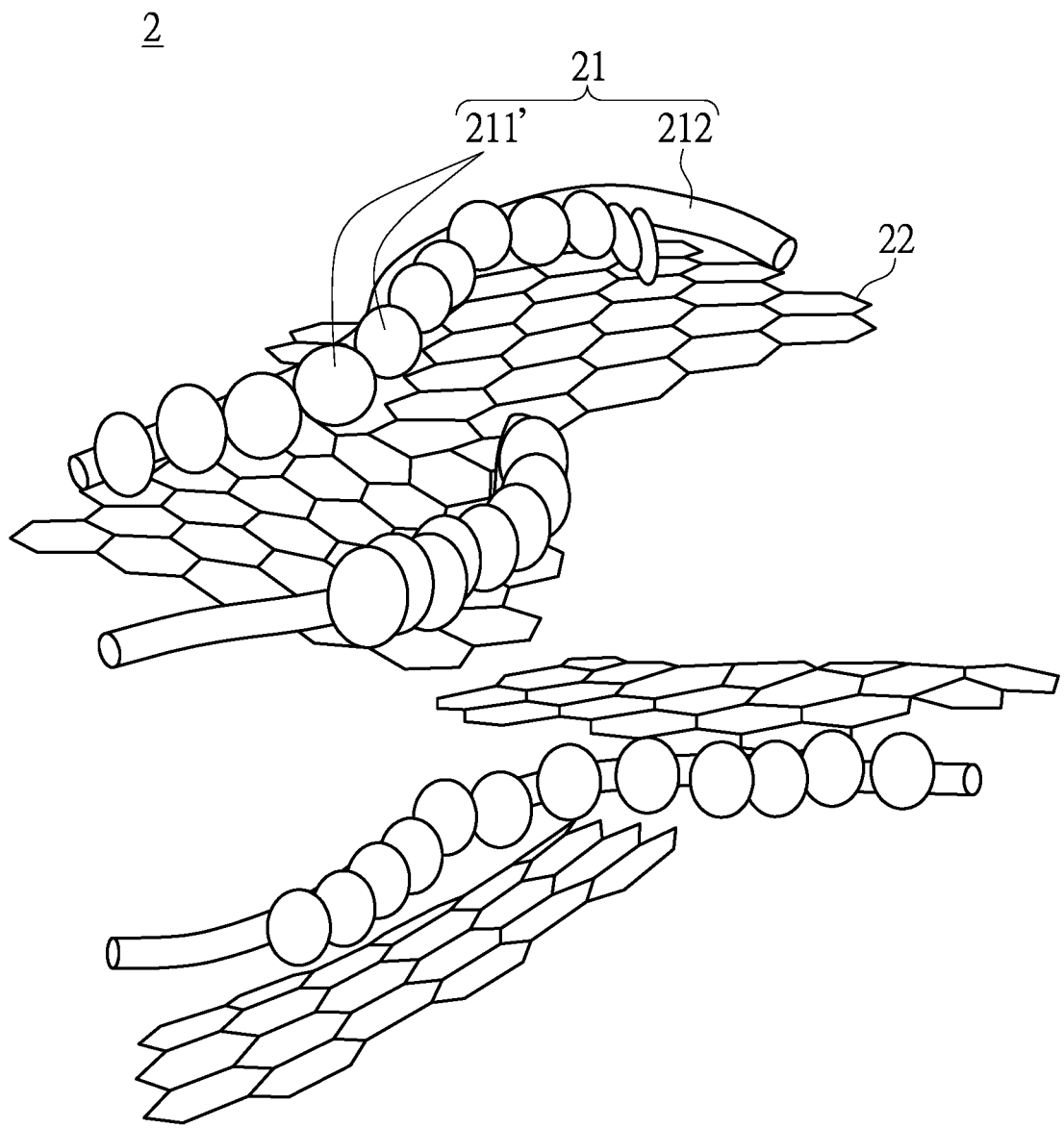
FIG. 5 is a structural schematic view of the polymer composite material provided by one of the embodiments of the instant disclosure.
Figure 9:
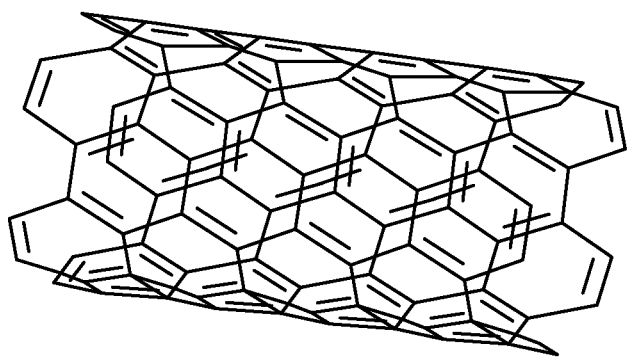
FIG. 9 is another structural schematic view of the carbon nanomaterial of the polymer composite material provided by the embodiments of the instant disclosure.
Figure 8:
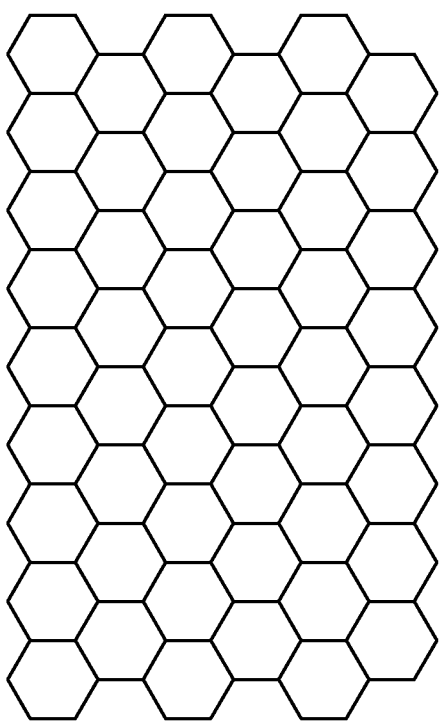
FIG. 8 is one of the structural schematic view of the carbon nanomaterial of the polymer composite material provided by the embodiments of the instant disclosure.
Figure 7:
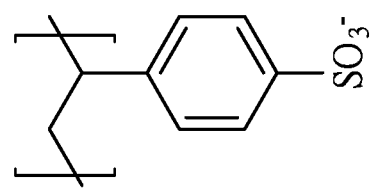
FIG. 7 shows the chemical structures of the poly(3,4-ethylenedioxythiophene) unit and the polystyrene sulfonate unit of the polymer composite material provided by the embodiments of the instant disclosure.
Figure 7:
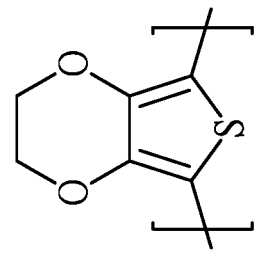

Please refer to FIG. 5, and FIG. 7 to FIG. 9. FIG. 5 is a structural schematic view of the polymer composite material provided by one of the embodiments of the instant disclosure, FIG. 7 shows the chemical structures of the poly(3,4-ethylenedioxythiophene) unit and the polystyrene sulfonate unit of the polymer composite material provided by the embodiments of the instant disclosure, FIG. 8 is one of the structural schematic view of the carbon nanomaterial of the polymer composite material provided by the embodiments of the instant disclosure, and FIG. 9 is another structural schematic view of the carbon nanomaterial of the polymer composite material provided by the embodiments of the instant disclosure. The polymer composite material 2 provided by the embodiments of the instant disclosure comprises the poly(3,4-ethylenedioxythiophene) unit (formed by 3,4-ethylenedioxythiophene 211'), a polystyrene sulfonate unit 212 and a carbon nanomaterial 22. 3,4-ethylenedioxythiophene 211' and the polystyrene sulfonate unit 212 can be used to form a PEDOT:PSS composite 21.

Please refer to FIG. 7, the PEDOT:PSS composite 21 is a mixture of two ionic polymers. The two ionic polymers are sodium polystyrene sulfonate and poly(3,4-ethylenedioxophene), in which sodium polystyrene sulfonate is a polystyrene sulfonate and poly(3,4-ethylenedioxophene) is a polythiophene-based conjugated polymer. The above ionic polymers together form a macromolecule salt, referred to as the PEDOT:PSS composite 21.

The PEDOT:PSS composite 21 has excellent conductivity. Compared to other polymer compounds such as Pani and PPy, the PEDOT:PSS composite 21 has lower polymerization velocity and is able to perform polymerization reaction under room temperature and hence, the preparation of the PEDOT:PSS composite 21 is easier than that of other polymer compounds. Besides, the PEDOT:PSS composite 21 has the advantages of good dispersing property, low manufacturing cost, high transparency and excellent processability. Therefore, using the PEDOT:PSS composite 21 as the material for forming the conductive polymer layer 102 on the cathode portion N of the capacitor 1 allows the capacitor 1 to exhibit enhanced electric performance.

In the embodiments of the instant disclosure, the carbon nanomaterial 22 is carbon nanotubes, carbon nanospheres, carbon freak graphenes or any combination thereof. FIG. 8 shows the structure of graphenes, and FIG. 9 shows the structure of carbon nanotubes. FIG. 5 is the structural schematic view of the polymer composite material 2 using graphenes as the carbon nanomaterial 22. Graphenes are planer films formed by carbon atom in sp2 hybrid orbital and have a thickness equal to a diameter of single carbon atom. Graphenes have high thermal conductivity, low resistance rate and high stability and hence, are excellent electrical and thermal conductance. Carbon nanotubes are formed by a single layer or multi-layered graphite of sp2 hybrid orbitals through winding respect to a same axial. Carbon nanotubes have good thermal resistance, good electric conductivity, high mechanical strength, flexibility and high surface area.

One of the technical features of the instant disclosure is to combine the three materials each having excellent property, i.e., the poly(3,4-ethylenedioxythiophene) unit 211, the polystyrene sulfonate unit 212 and the carbon nanomaterial 22, and to apply the polymer composite material 2 formed by chemical reactions between the three materials in the cathode portion of a capacitor, thereby effectively improving the electric performance of the capacitor, i.e., the capacitor can have improved conductivity, improved thermal stability, improved polymer impregnating rate, improved capacitance, reduced equivalent series resistance, reduced loss factor and reduced leak current.

As shown in FIG. 5, in an embodiment, the poly(3,4-ethylenedioxythiophene) unit 211, the polystyrene sulfonate unit 212 and the carbon nanomaterial 22 co-react to form the polymer composite material 2 of the instant disclosure. For example, the PEDOT:PSS composite 21 constituted by the poly(3,4-ethylenedioxythiophene) unit 211 and the polystyrene sulfonate unit 212 bonds to the carbon nanomaterial 22 after the reactions. The carbon nanomaterial 22 surrounds the PEDOT:PSS composite 21, or encloses the PEDOT:PSS composite 21. For example, in the embodiments of the instant disclosure, the PEDOT:PSS composite 21 and the carbon nanomaterial 22 can be bonded to each other through surface modification and stabilizing techniques.

In the embodiments of the instant disclosure, based on the weight of the polymer composite material 2, the content of the carbon nanomaterial 22 ranges from 0.01-1.5 wt. %. Preferably, in the embodiments of the instant disclosure, the carbon nanomaterial 22 having the above content can improve the electric properties of the capacitor. In other words, the polymer composite material 2 provided by the instant disclosure can improve the electric properties of the capacitor by using a small amount (less than 0.1 wt %) of the carbon nanomaterial 22.

In addition, before forming the polymer composite material 2 provided by the instant disclosure, the surface of the carbon nanomaterial 22 can be modified. The surface modification techniques of the carbon nanomaterial 22 can be categorized into (1) acidizing the defects on the surface of the carbon nanomaterial 22, then functionalizing the carbon nanomaterial 22, and (2) directly attaching or bonding specific functional groups onto the surface of the carbon nanomaterial 22. For example, the carbon nanomaterial 22 can be modified through carboxylic group or hydroxyl group for improving the reactivity of the carbon nanomaterial 22 to enable the carbon nanomaterial 22 to be dispersed in solvents such as de-ionized water or organic solvents, or to allow the carbon nanomaterial 22 to be well-mixed with polymer materials (such as the PEDOT:PSS composite 21). However, the modification process and the modifier for the carbon nanomaterial 22 are not limited in the instant disclosure.

Figure 6:
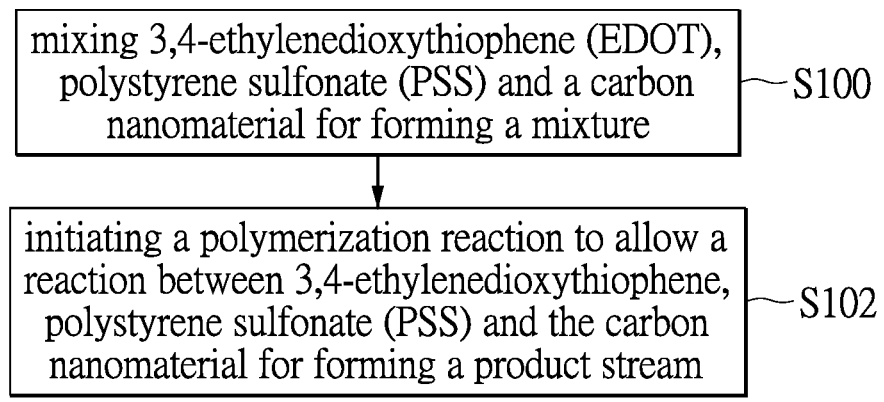
FIG. 6 is a flow chart of the method for manufacturing the polymer composite material provided by one of the embodiments of the instant disclosure.

Please refer to FIG. 6. FIG. 6 is a flow chart of the method for manufacturing the polymer composite material provided by one of the embodiments of the instant disclosure. The embodiment shown in FIG. 6 comprises mixing 3,4-ethylenedioxythiophene (EDOT), polystyrene sulfonate (PSS) and a carbon nanomaterial for forming a mixture (S100); and initiating a polymerization reaction to allow a reaction between 3,4-ethylenedioxythiophene, polystyrene sulfonate (PSS) and the carbon nanomaterial for forming a product stream (S102).

Specifically, the polymer composite material 2 provided by the instant disclosure can be formed by different methods. In the method for manufacturing the polymer composite material 2 shown in FIG. 6, the carbon nanomaterial 22 can be graphenes or carbon nanotubes, and the graphenes or carbon nanotubes can be pre-treated, for example, by surface-modification. For example, graphene oxide (GO) or reduced graphene oxide (RGO) can be used as the material for manufacturing the polymer composite material 2.

In one embodiment of the instant disclosure, 3,4-ethylenedioxythiophene 211', the polystyrene sulfonate unit 212 and the carbon nanomaterial 22 form the polymer composite material 2 through an in-situ polymerization reaction. In the present embodiment, the carbon nanomaterial 22 is reduced graphene oxides (RGO). The RGO and the polystyrene sulfonate unit 212 are first dissolved in a solvent for forming a solution. The polystyrene sulfonate unit 212 in the solution can be served as the reactant for forming the PEDOT:PSS composite 21 and the dispersant for dispersing RGO. The solvent can be an organic solvent or water.

Next, 3,4-ethylenedioxythiophene 211' is added into the solution. The polymerization reaction can be initiated by adding an oxidant. Meanwhile, the mixture solution of 3,4-ethylenedioxythiophene 211', the polystyrene sulfonate unit 212 and the carbon nanomaterial 22 can be heated and stirred. For example, by flowing air or oxygen through the mixture solution or adding iron (III) sulfate or sodium persulfate, the polymerization reaction is initiated. The use of a stir bar or a stirrer which provide mechanical stirring can facilitate the reaction. During the polymerization process, the reaction temperature can be controlled. For example, the mixture solution is heated to a temperature between 30 to 60° C. The time of stirring such as ultrasonic stirring can be 1 to 24 hours.

In addition, during the polymerization process, nitrogen gas can be input into the reaction environment to avoid the poly(3,4-ethylenedioxythiophene) unit 211 being over-oxided and reduce the electric conductivity of the polymer composite material 2 formed therefrom. After the reaction is completed, remained ions in the product stream can be removed by purifying processes such as a process using an ion exchange resin.

A dispersing agent can be further added into the mixture solution during the polymerization process to facilitate the dispersion and stability of the mixture solution. For example, the dispersing agent can be sodium dodecyl-sulfonate. For example, when the carbon nanomaterial 22 is graphenes, the structure of the graphenes can be folded and forms a folded structure in the solvent, thereby reducing the possibility of combing (bonding) with the PEDOT:PSS composite 21. Therefore, a dispersing agent can solve the above problem to ensure the graphenes to be surface-modified with the PEDOT:PSS composite 21 for forming the polymer composite material 2 provided by the instant disclosure.

Alternatively, in another embodiment of the instant disclosure, graphenes dissolved in a solvent can be directly mixed with the PEDOT:PSS composite 21 for bonding the graphenes with the PEDOT:PSS composite 21. In this embodiment, the graphenes can be graphene oxide (GO) or reduced graphene oxide (RGO). However, since GO has relatively low electric conductivity, when the GO is used as a material for forming the polymer composite material 2, a further reduction reaction may be needed after mixing the GO with the PEDOT:PSS composite 21 for improving the electric conductivitiy of the graphenes. The reducing agent for performing the reduction reaction is, for example, hydrazine (N2H4). However, the instant disclosure is not limited thereto.

The polymer composite material 2 manufactured by the method provided by the instant disclosure can be directly used as the material for forming the cathode of a capacitor. For example, the polymer composite material 2 can be coated on the cathode of the capacitor through a film-forming process. Specifically, a capacitor unit can be impregnated into a solution comprising the polymer composite material 2 for forming a conductive polymer layer on the surface thereof.

Alternatively, after step S102, the product stream can be further purified for separating the polymer material. Therefore, the purity of the polymer composite material 2 can be ensured. For example, the product stream comprising the polymer composite material 2 can be purified by at least one of centrifugation, dialysis, column chromatography, precipitation and ion exchange process.

After the step of purifying the product stream, the polymer composite material 2 can be further homogeneously dispersed. For example, the polymer composite material 2 can be homogeneously dispersed by at least one of a homogenous stirrer, ultrasonic grinder, high pressure homogenizer and ball mill.

Figure 10:
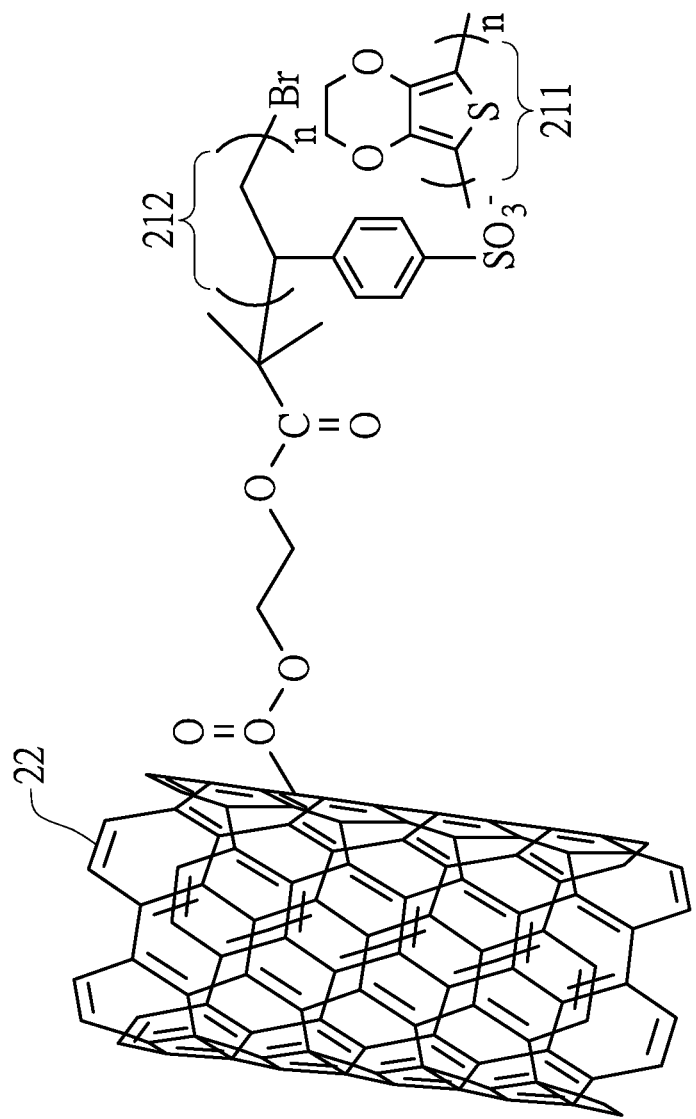
FIG. 10 is the structural schematic view of the polymer composite material provided by another one of the embodiments of the instant disclosure.

Another embodiment of the instant disclosure provides another polymer composite material and method for manufacturing the same. Please refer to FIG. 10 and FIG. 11. FIG. 10 is the structural schematic view of the polymer composite material of this embodiment, and FIG. 11 is the flow chart of the method for manufacturing the polymer composite material.

Specifically, compared to the embodiment shown in FIG. 5 and FIG. 6, the poly(3,4-ethylenedioxythiophene) unit 211, the polystyrene sulfonate unit 212 and the carbon nanomaterial 22 are connected in a different manner to form the polymer composite material 2. As shown in FIG. 10, the polystyrene sulfonate unit 212 is connected between the carbon nanomaterial 22 and the poly(3,4-ethylenedioxythiophene) unit 211, and the polystyrene sulfonate unit 212 is connected to the polystyrene sulfonate unit 212 through a polymerization process. The method for manufacturing the polymer composite material of the present embodiment is described below.

Figure 11:
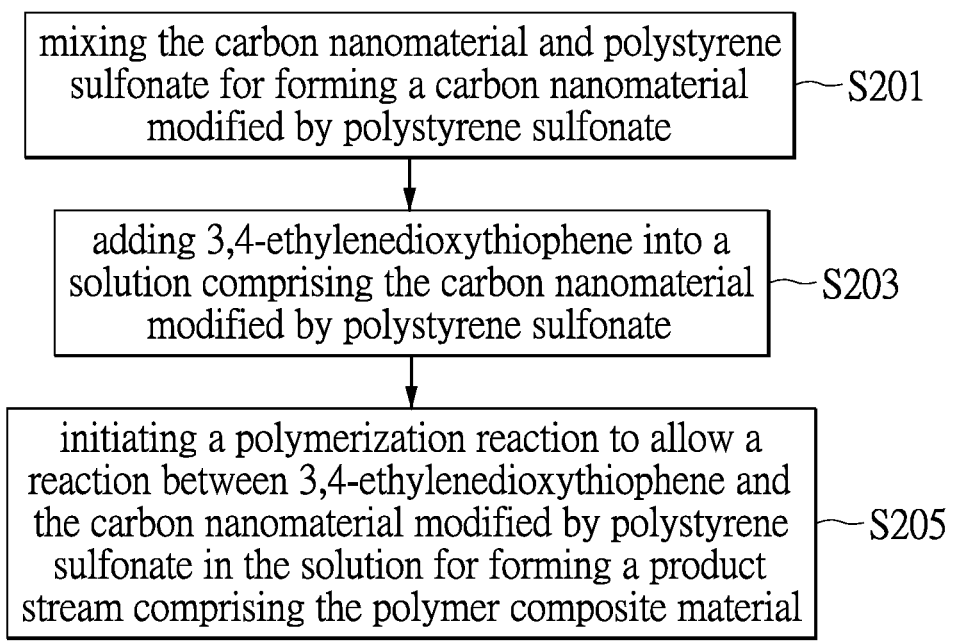
FIG. 11 is a flow chart of the method for manufacturing a polymer composite material provided by another one of the embodiments of the instant disclosure.

As shown in FIG. 11, the method for manufacturing the polymer composite material comprises mixing the carbon nanomaterial 22 and polystyrene sulfonate for forming a carbon nanomaterial modified by polystyrene sulfonate (S201); adding 3,4-ethylenedioxythiophene into a solution comprising the carbon nanomaterial modified by polystyrene sulfonate (S203); and initiating a polymerization reaction to allow a reaction between 3,4-ethylenedioxythiophene and the carbon nanomaterial modified by polystyrene sulfonate in the solution for forming a product stream comprising the polymer composite material (S205).

Please refer to FIG. 10. In the polymer composite material 2 manufactured by the method described above, the polystyrene sulfonate unit 212 is connected between the carbon nanomaterial 22 and a poly(3,4-ethylenedioxythiophene) unit 211, and the polystyrene sulfonate unit 212 is bonded to the poly(3,4-ethylenedioxythiophene) unit 211 through a polymerization reaction. Based on the weight of the polymer composite material, the content of the carbon nanomaterial 22 is from 0.01-1.5 wt. %.

Specifically, step S201 is for forming the carbon nanomaterial modified with PSS. In the embodiment shown in FIG. 10 and FIG. 11, the carbon nanomaterial 22 is carbon nanotubes. However, the type of the carbon nanomaterial 22 is described in the previous embodiments and can be carbon nanotubes, carbon nanospheres, graphenes, carbon freak or any combination thereof. The carbon nanotubes shown in FIG. 10 can be formed by a thermal chemical vapor deposition process.

Before performing step S201, the carbon nanomaterial 22 (carbon nanotubes, CNT) can be surface-modified. In the present embodiment, the carbon nanotubes are treated with the mixture of concentrated sulfuric acid and nitric acid ($HNO_3$:$H_2SO_4$=3:1, v/v) for bonding carboxylic groups on the surface of the carbon nanotubes, thereby forming CNT-COOH. Next, the carboxylic groups on the surface of the carbon nanotubes react with thionyl choloride ($SOCl_2$) for forming carbon nanotubes modified with thinoyl chloride (CNT-COCl). The CNT-COCl is reflux by 2-hydroxyethtl-2'-bromoisobutyrate and toluene to synthesis carbon nanotubes with bromide groups (CNT-Br).

After the activation process mentioned above, the activated carbon nanotubes (CNT-Br) are mixed with polystyrene sulfonate 212. Specifically, the polystyrene sulfonate 212 can be provided by sodium polystyrene sulfonate. For example, the reaction between the CNT-Br and the sodium polystyrene sulfonate can be carried out in a N,N-dimethylformamide solution with the copper bromide and PMDTA (N,N,N',N',N"-pentamethyldiethylenetriamine) as reaction additive. The reaction temperature in step S201 can be, for example, 120° C., and the reaction time can be about 30 hours. After the reaction is completed, the product can be separated by centrifugation or filtration, thereby obtained the carbon nanomaterial (carbon nanotube) modified by PSS.

In step S203, 3,4-ethylenedioxythiophene is added into the solution comprising the carbon nanomaterial modified by PSS. For example, the solvent for dissolving the carbon nanomaterial modified by PSS is water.

In step S205, initiating a polymerization reaction to allow the carbon nanomaterial modified by PSS and the 3,4-ethylenedioxythiophene in the solution for forming a product stream comprising the polymer composite material 2. After the polymerization reaction is completed, the polymer composite material 2 comprises the polystyrene sulfonate unit 212, the poly(3,4-ethylenedioxythiophene) unit 211 and the carbon nanomaterial 22. The polymerization reaction can be carried out by chemical oxidative method under the presence of 3,4-ethylenedioxythiophene 211' and polystyrene sulfonate. Ammonium persulfate (APS) can be added during the polymerization reaction, and mechanical stirring can be applied. For example, the product stream comprising the polymer composite material 2 can be formed by mechanical stirring the solution for 48 hours under room temperature.

The structure of the polymer composite material 2 formed by polymerization process is shown in FIG. 10. Since the carbon nanotube is activated before performing step S201, the activated carbon nanotube is bonded to the polystyrene sulfonate unit 212 through the modified functional groups on the surface thereof. In other words, in the embodiments of the instant disclosure, the carbon nanomaterial 22 does not have to directly bond to the polystyrene sulfonate unit 212. However, the instant disclosure is not limited thereto. In other words, the carbon nanomaterial 22 can be directly bonded to the polystyrene sulfonate unit 212.

As mentioned before, the polymer composite material 2 manufactured by the method mentioned can be directly used as the material for the cathode of the capacitor. Alternatively, after step S203, the product stream can be further purified for separating the polymer composite material 2. After the purifying step, the polymer composite material 2 can further be homogeneously dispersed. The details for performing purification and homogeneously dispersion are described in the previous embodiments and are not described herein.

In addition, the instant disclosure further provides a method for manufacturing capacitor package structure, comprising: providing at least a capacitor in which the cathode of the capacitor comprises the polymer composite material manufactured by the method mentioned above; and packaging the capacitor by a package structure. A positive electrode pin and a negative electrode pin electrically connected to the capacitor are exposed from the package structure.

Please refer to FIG. 2 and FIG. 4. FIG. 2 is a sectional view of one of the capacitor packaging provided by the embodiments of the instant disclosure; and FIG. 4 is a side schematic view of another capacitor package structure provided by the embodiments of the instant disclosure. The capacitor 1 can be the capacitor unit 42 in the stacked type solid electrolytic capacitor 4, or the wound type component 31 of the wound type solid electrolytic capacitor 3. The package structure can be the package 43 in the stacked type solid electrolytic capacitor 4, or the packaging component 32 in the wound type solid electrolytic capacitor 3. The details of the above components are described above regarding the capacitor package structure.

In summary, the effectiveness of the instant disclosure is that the polymer composite material 2 of the instant disclosure comprises a carbon nanomaterial 22 of specific content and thus has excellent electric property. Therefore, the solid electrolytic capacitor comprising the polymer composite 2 has improved conductivity, improved thermal stability, improved polymer impregnating rate, improved capacitance, reduced equivalent series resistance, reduced loss factor and reduced leak current. In addition, the method of manufacturing the polymer composite material 2 of the instant disclosure has reduced manufacturing cost and hence, the overall manufacturing cost of the solid electrolytic capacitor is reduced.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A polymer composite material for a cathode portion of a capacitor, comprising a poly(3,4-ethylenedioxythiophene) unit, a polystyrene sulfonate unit and a carbon nanomaterial, the polystyrene sulfonate unit is connected between the
    poly(3,4-ethylenedioxythiophene) unit and the carbon nanomaterial, and the polystyrene sulfonate unit is bonded to the poly(3,4-ethylenedioxythiophene) unit through a polymerization process, the content of the nanomaterial ranging from 0.01-1.5 wt. % based on the weight of the polymer composite material.

2. The polymer composite material according to claim 1, wherein the carbon nanomaterial is a carbon nanotube, a carbon nanosphere, graphene, carbon freak or any combination thereof.

3. The polymer composite material according to claim 1, wherein the carbon nanomaterial is surface-modified by carboxylic groups or hydroxyl groups.

4. The polymer composite material according to claim 1, wherein the content of the carbon nanomaterial ranges from 0.01-0.1 wt. %, not including 0.1 wt. %, based on a weight of the polymer composite material.

5. A capacitor package structure comprising at least a capacitor, a cathode portion of the capacitor comprises the polymer composite material according to claim 1.

6. A method for manufacturing a polymer composite material, comprising:
    mixing a carbon nanomaterial with polystyrene sulfonate to form a carbon nanomaterial modified by polystyrene sulfonate;
    adding 3, 4-ethylenedioxythiophene into a solution comprising the carbon nanomaterial modified by polystyrene sulfonate; and
    initiating a polymerization reaction to allow a reaction between 3, 4-ethylenedioxythiophene and the carbon nanomaterial modified by polystyrene sulfonate in the solution for forming a product stream comprising the polymer composite material, the polymer composite material comprising a poly(3,4-ethylenedioxythiophene) unit, a polystyrene sulfonate unit and the carbon nanomaterial;
    wherein the polystyrene sulfonate unit is connected between the poly(3,4-ethylenedioxythiophene) unit and the carbon nanomaterial, and the polystyrene sulfonate unit is bonded to the poly(3,4-ethylenedioxythiophene) unit through a polymerization process, the content of the nanomaterial ranging from 0.01-1.5 wt. % based on the weight of the polymer composite material.

7. The method according to claim 6, wherein the step of initiating the polymerization reaction further comprises adding an oxidant into the solution.

8. The method according to claim 6, wherein the step of initiating the polymerization reaction further comprises homogeneously stirring the solution comprising 3,4-ethylenedioxythiophene.

9. The method according to claim 6, wherein before the step of mixing the carbon nanomaterial with polystyrene sulfonate, the method further comprises activating a surface of the carbon nanomaterial.

10. The method according to claim 6, wherein after the step of initiating the polymerization reaction, the method further comprises purifying the product stream for separating the polymer composite material.

11. The method according to claim 10, wherein the step of purifying the product stream comprises purifying the product by at least one of centrifugation, dialysis, column chromatography, precipitation and ion exchange process.

12. The method according to claim 10, wherein after the step of purifying the product stream, the method further comprises homogeneously dispersing the polymer composite material.

13. The method according to claim 12, wherein the step of homogeneously dispersing the polymer composite material comprises homogeneously dispersing the polymer composite material by at least one of a homogenous stirrer, ultrasonic grinder, high pressure homogenizer and ball mill.

14. A method for manufacturing a capacitor package structure, comprising:
   providing at least a capacitor having a cathode comprising the polymer composite material manufactured by the method according to claim 6; and
   packaging the capacitor with a package structure, wherein a positive pin and a negative pin both electrically connected to the capacitor are exposed from the package structure.

* * * * *